United States Patent [19]

Tachi

[11] 4,232,347
[45] Nov. 4, 1980

[54] VIDEO TAPE CONTROL TIME CODE READING

[75] Inventor: Katsuichi Tachi, Kawasaki, Japan

[73] Assignee: Sony Corporation, Tokyo, Japan

[21] Appl. No.: 960,856

[22] Filed: Nov. 15, 1978

[30] Foreign Application Priority Data

Nov. 18, 1977 [JP]  Japan .................................. 52-138756

[51] Int. Cl.² ............................................. G11B 15/52
[52] U.S. Cl. ...................................... 360/73; 360/72.2
[58] Field of Search ........................ 360/14, 73, 33, 70, 360/72.1, 72.2; 358/147, 4

[56] References Cited

U.S. PATENT DOCUMENTS

| | | | |
|---|---|---|---|
| 3,681,524 | 8/1972 | Nicholls | 360/14 X |
| 4,037,260 | 7/1977 | Busby, Jr. et al. | 360/73 |
| 4,044,389 | 8/1977 | Oldershaw et al. | 360/73 |
| 4,134,130 | 1/1979 | Tachi | 358/147 |
| 4,167,759 | 9/1979 | Tachi | 360/14 |

Primary Examiner—Bernard Konick
Assistant Examiner—Donald McElheny, Jr.
Attorney, Agent, or Firm—Lewis H. Eslinger; Alvin Sinderbrand

[57] ABSTRACT

A video magnetic tape control time code reading method and apparatus employs a control time code comprising binary coded times and frame numbers which together form addresses of individual frames of a video signal recorded on a video magnetic tape which can be read, independently of the direction and speed of transport of the video tape, to ascertain whether the control time code corresponds to a recorded video signal having a frame frequency of 30 or 25 frames per second. Use is made of the fact that certain frame numbers occur in a 30 frame per second control time code which do not occur in a 25 frame per second control time code.

15 Claims, 31 Drawing Figures

VIDEO TAPE CONTROL TIME CODE READING

BACKGROUND OF THE INVENTION

1. Field of the Invention

The present invention relates to video tape control time code reading method and apparatus. Embodiments of the invention may be incorporated into video tape recorders (VTRs) to enable dual-standard VTRs to be made. Such a dual-standard VTR is capable of distinguishing recorded video signals having a frame frequency of 30 frames per second, such as in the National Television System Committee (NTSC) system, and recorded video signals having a frame frequency of 25 frames per second, such as in the International Radio Consultative Committee (CCIR) system.

2. Description of the Prior Art

Most particularly for professional purposes, that is to say for the purposes of people concerned with the production and transmission of television, the editing of video tape is of substantial importance. While such editing can be done by cutting and splicing the video tape, this method is extremely tedious and time-consuming, involves considerable risk of irreparably damaging the video tape, and in any case substantially degrades the quality of signal reproduction which can be obtained from the edited video tape. So-called electronic editing is therefore now preferred, and in this method signals are selectively recorded on a single video tape from more than one source, or an existing signal on a video tape is edited by erasing parts of the recorded signal and recording substitute parts derived from another source. This can be done without introducing any discontinuity into the edited recorded signal subsequently to be reproduced. A critical factor in such editing is the ability to rapidly locate specific parts of a signal, most particularly individual frames. For this purpose the Society of Motion Picture and Television Engineers (SMPTE) in the United States of America and the European Broadcasting Union (EBU) in Europe have proposed respective so-called control time codes for recording on a video tape, for example, on the number 2 audio track or cue track. The SMPTE control time code will be described in detail below, and in fact the EBU control time code is very similar, most of the differences not being material to the present invention. The essential feature of each of the control time codes is that it comprises in binary coded form a time, which may be the time of day, expressed in hours, minutes and seconds, and, individual frame numbers of the recorded video signal within each second. In other words, each frame of the recorded video signal is uniquely identified. The different frame frequencies result in a different bit frequency in the control time code, but the difference is only in the ratio 6:5, and is thus difficult to detect. Moreover, the difference can only be detected when the video tape is being transported at a known speed, which is not the case in fast forward or rewind operation.

These control time codes and VTRs able to read and be controlled making use of these control time codes enormously facilitate editing, but there is a problem, at least for professional users, that different video tapes bearing recorded signals corresponding to different systems, and in particular systems operating at different frame frequencies, need to be distinguishable to ensure appropriate decoding and correct reproduction.

OBJECTS AND SUMMARY OF THE INVENTION

One object of the present invention is to provide a video tape control time code reading method and apparatus capable of distinguishing control time codes corresponding to television systems operating at different frame frequencies.

Another object of the present invention is to provide a video tape control time code reading method and apparatus capable of identifying a control time code derived from a video tape, and in particular the frame frequency thereof, independently of the direction of transport of the video tape.

Another object of the present invention is to provide a video tape control time code reading method and apparatus capable of identifying a control time code derived from a video tape, and in particular the frame frequency thereof, whether the video tape is being transported at a normal speed such as used for recording and/or reproduction, a higher speed such as used for rewinding or fast-forward transportation, or at a lower speed such as used during editing.

A still further object of the present invention is to provide a control time code reading method and apparatus for automatically reading a control time code and developing an output signal indicating whether the recorded video signal is a 25 or a 30 frame per second signal.

According to an aspect of the invention, there is provided a method for distinguishing between first and second control time codes having at least frame codes which identify repeating sequences of contiguous frame numbers therein reproduced from a video magnetic tape containing video signals recorded thereon, comprising the steps of sensing the presence and absence of predetermined frame numbers in the reproduced control time code and detecting, in dependence on the presence and absence of the predetermined numbers, whether the reproduce control time code is the first or the second control time code.

According to a feature of the invention, a method is provided for distinguishing between at least first and second control time codes reproduced from a video tape which contains frames of video recorded thereon, the first control time code including at least first repeating sequences of frame codes identifying individual frames of the video, the first repeating sequences repetitively beginning with a first number and ending with a second number, the second control time code including at least second repeating sequences of frame codes identifying individual frames of the video, the second repeating sequences repetitively beginning with the first number and ending with a third number which is greater than the second number, comprising the steps of sensing one of the first, second and third numbers, and sensing whether a next-occurring frame code after the sensing of the one of the first, second and third numbers includes a next frame number in one of the repeating sequences, and producing in dependence thereon an output signal indicative of one of the first and second control time codes.

The invention makes use of the fact that frame numbers exist in a recorded signal having a frame frequency of 30 frames per second which do not exist in a recorded signal having a frame frequency of 25 frames per second.

The above, and other objects, features and advantages of this invention will be apparent from the following detailed description of illustrative embodiments which is to be read in connection with the accompanying drawings in which like reference numerals designate the same elements.

DETAILED DESCRIPTION OF THE PREFERRED EMBODIMENTS

Figure 1:
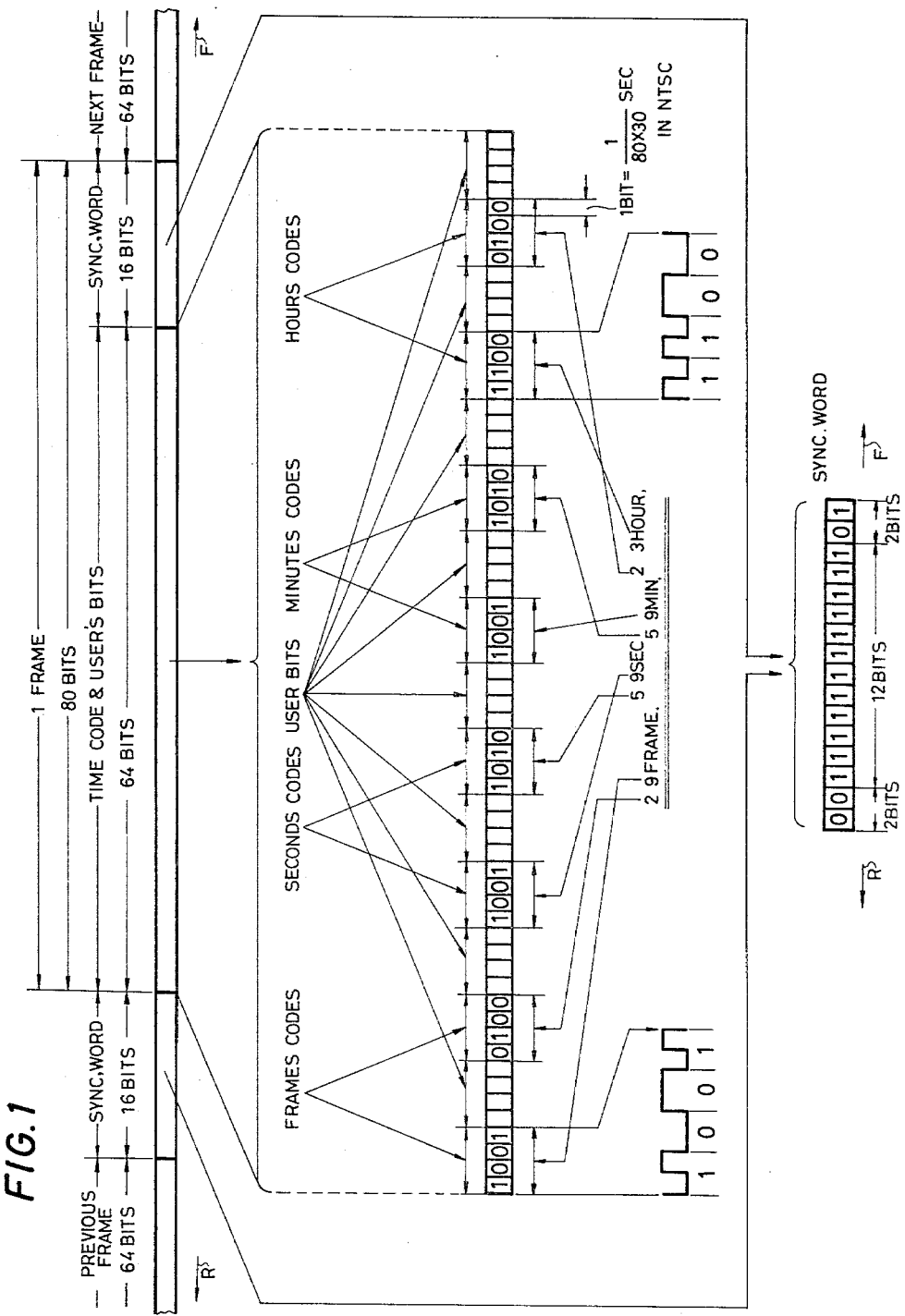
FIG. 1 is a diagram showing an SMPTE digital control time code for one frame and parts of adjacent frames of a recorded video signal.

The SMPTE control time code for a single frame and part of two adjacent frames is shown in FIG. 1, to which reference is now made. For each frame the control time code comprises 80 binary bits. Bits 0 to 63 provide the time and frame codes as well as spare bits for use by the user if desired. Bits 64 to 79 comprise a sync word. The control time code is conventionally recorded in a linear track as a phase-modulated serial code, usually referred to as a biphase mark. The control time code is selfcontained and self-clocking and is immune to 180° phase reversals. Since it is a square wave, it can be recorded using a saturated or unsaturated recording method.

Each sync word is the same as shown at the bottom of FIG. 1. The 16-bit pattern of the sync word is unique, in the sense that it cannot occur elsewhere in the control time code, and it provides both an indication of the direction in which the video tape is being transported, that is, in the forward or reverse direction of transport (marked F and R in FIG. 1), and also identifies the beginning and/or ending of the set of 80 bits corresponding to a frame, so that the 64 bits providing the time and frame codes can be extracted for processing.

The 64 bits providing the time and frame codes include, as shown from right to left in FIG. 1, 4 bits for tens of hours, 4 bits for units of hours, 4 bits for tens of minutes, 4 bits for units of minutes, 4 bits for tens of seconds, 4 bits for units of seconds, 4 bits for tens of frames and 4 bits for units of frames. Each of these groups of 4 bits is preceded by a respective group of 4 bits which the user can use for his own purposes if desired. In the example shown, the binary digits indicated show that the particular frame is identified by a time code of 23 hours, 59 minutes, 59 seconds and is frame number 29 within that second. Although there are further refinements to the SMPTE control time code, since they are not material to the present invention, they are omitted. Full details can be found in the Journal of the SMPTE Vol. 79, Dec. 1970, pp. 1086 to 1088.

The EBU control time code is very similar to the SMPTE control time code, the differences in form and content between them are not significant to the present invention, except as concerns frame frequency. The SMPTE control time code is normally used for video signals with a frame frequency of 30 frames per second and the EBU control time code is normally used for video signals with a frame frequency of 25 frames per second.

When using a VTR, each frame, or alternatively each field of a video signal is recorded in a respective track of a video magnetic tape, the tracks being disposed obliquely relative to the direction of transport of the video tape, and in recording and reproduction a rotary magnetic head arrangement scans the video tape. During reproduction, the scanning is under the control of a control signal which is derived from a control signal track running lengthwise along the edge of the video tape. The video tape also carries at least a number 1 and a number 2 or cue audio tracks, also running lengthwise along the video tape. The control time code may be recorded in the number 2 audio track or in the oblique tracks during the vertical blanking intervals of the video signal.

The present invention derives the control time code from the video tape, determines the direction of tape transport from the sync word, and extracts the 64 bits providing the time and frame codes. The embodiments of the invention make use of the fact that the control time code for recorded video signals in which the frame frequency is 30 frames per second contains frame numbers which do not occur with recorded signals in which the frame frequency is 25 frames per second. In the following description it is assumed that, when there are 30 frames per second, the 30 frames in a second are numbered 00 to 29, and when there are 25 frames per second, the 25 frames are numbered 00 to 24, as is the usual practice. Where the frame frequency is 30 frames per second, therefore, there exist frame numbers 25, 26, 27, 28 and 29 which do not exist when the frame frequency is 25 frames per second. It will be clear to those skilled in the art how the present invention may be modified if the frames are numbered 1 to 30 and 1 to 25.

Detection based on the frame numbers can be done independently of the direction of tape transport and of the speed of tape transport, and no modification of the control time code is required to enable the frame frequency to be detected.

The first embodiment of the invention is described with reference to FIG. 2. The control time code derived from a video tape (not shown) may be supplied to an input terminal 1 connected to a code reader 2, or alternatively, code reader 2 may extract the control time code from a reproduced signal derived from the video tape and supplied to input terminal 1. Code reader 2 detects the direction of tape transport from the sync word, and in dependence thereon supplies a signal Pd which is high or "1" for tape transport in the forward direction and low or "0" for tape transport in the reverse direction. Signal Pd is supplied to one input of each of AND gates 10 and 11, and via respective inverters 24 and 25 to one input of each of AND gates 9 and 12. The signal Pd may be used by indicating apparatus (not shown) to provide a visual indication of the tape transport direction.

Code reader 2 also develops a clock pulse signal CP1 synchronized to the frame frequency of the control time code, and supplies clock signal CP1 to a memory 3, a delay 15, and one input of an AND gate 16. Code reader 2 also extracts the 64 bits providing the time and frame codes and supplies them to memory 3 for storage therein.

An output 4 is optionally connected from memory 3, for supplying the time and frame codes to a display 22 or a television picture monitor 23. Display 22, or the monitor 23, if provided, may incorporate decoding means to decode the time and frame codes and to provide a visual display of the time and frame number either alone or in association with a television picture, respectively.

Memory 3 also derives a frame code signal Sf, suitably of 8 bits, comprising 4 bits for the tens of frames and 4 bits for the units of frames, which is supplied to respective frame code detectors 5, 6, 7 and 8. Frame code detector 5 supplies an output signal S00 which is "1" when the frame code signal Sf represents frame 00, and is "0" at all other times. Likewise, frame code detectors 6, 7 and 8 respectively supply output signals S24, S35 and S29 which are "1" when frame code signal Sf represents frames 24, 25 and 29 respectively, and are "0" at all other times. The outputs of frame code detectors 5, 6, 7 and 8 are supplied to second inputs of AND gates 9, 10, 11 and 12, respectively. The outputs of AND gates 9 and 10 are connected to two inputs respectively of an OR gate 13. The two outputs of AND gates 11 and 12 are connected to two inputs of an OR gate 14. The output of OR gate 13 is connected by way of delay 15 to the other input of AND gate 16. The output of AND gate 16 supplies a gated clock pulse signal CP2 which is applied to the clock input CK of a JK flip-flop 17. The output of OR gate 14 is connected directly to the J input of flip-flop 17, and by way of an inverter 26 to the K input flip-flop 17.

An output signal is derived at an output terminal 18 connected to the Q output of flip-flop 17. For reasons which will be explained below this output signal is "1" when the input control time code corresponds to a frame frequency of 30 frames per second and is "0" when the input control time code corresponds to a frame frequency of 25 frames per second. This output signal can therefore be used to provide an indication and/or effect a control, for example in a dual-standard VTR. In particular, in a dual-standard VTR, the output signal can be used to ensure reproduction of a recorded video signal at the appropriate frame frequency, and on the assumption that a recorded signal with a frame frequency of 30 frames per second is an NTSC system signal, and a recorded signal with a frame frequency of 25 frames per second is a CCIR system signal, can condition the VTR to effect appropriate decoding.

The way in which the embodiment of FIG. 2 derives the appropriate output signal will now be explained with reference to FIGS. 3A to 3F which show waveforms of signals produced when the control time code supplied to input terminal 1 is an SMPTE control time code associated with a video signal having a frame frequency of 30 frames per second reproduced from a video tape running in the forward tape transport direction.

Figure 3:
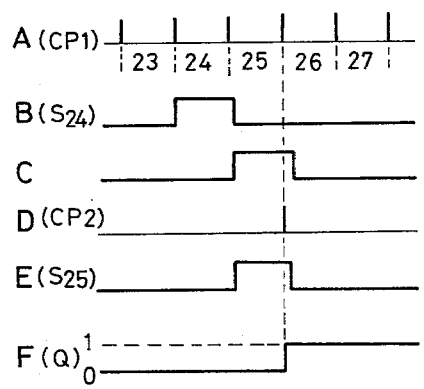
FIGS. 3A-3F are waveforms to which reference will be made in explaining the function of the apparatus in detecting a time code from a recorded signal having a frame frequency of 30 frames per second where the tape is run in the forward direction.

Clock signal CP1 (FIG. 3A), derived by code reader 2, comprises short pulses with a repetition frequency synchronized with the frame frequency of the control time code. The precise value of this frequency varies depending on the speed at which the video tape is being transported. Since the tape transport direction is forward, signal Pd enables AND gates 10 and 11, but signal Pd, inverted in inverters 24 and 25 inhibits, or makes nonconductive, AND gates 9 and 12. When the frame code for frame 24 is supplied to frame code detector 6, the output signal S24 thereof changes from "0" to "1" (FIG. 3B). The resulting pulse passes AND gate 10 and, after being delayed by one frame period by delay 15, is supplied to AND gate 16. This delayed pulse, (FIG. 3C) acts as a gating pulse for clock signal CP1 at AND gate 16, to allow one short pulse from clock signal CP1 to pass in order to form the gated clock pulse signal CP2 (FIG. 3D).

When the frame code for frame 25 is supplied to frame code detector 7, the output signal S25 thereof changes from "0" to "1" (FIG. 3E), and the resulting pulse passes AND gate 11 and OR gate 14, to be applied to the J and K inputs of flip-flop 17 directly and after inversion respectively. In coincidence with this, the short gated clock pulse CP2 is supplied to flip-flop 17. As is conventional, when a clock signal is applied to the clock input CK of JK flip-flop 17, its set output Q is forced to agree with the signal at its J input. Thus, a "1" output signal is developed at the Q output of flip-flop 17 (FIG. 3F). If the Q output of flip-flop 17 was originally "1", it remains "1". This condition indicates 30 frames per second.

Reference is now made to FIGS. 4A to 4F, which show waveforms developed when the control time code supplied to the input terminal 1 is an EBU control time code associated with a video signal having a frame frequency of 25 frames per second and which are reproduced from a video tape operating in the forward tape transport direction.

Figure 4:
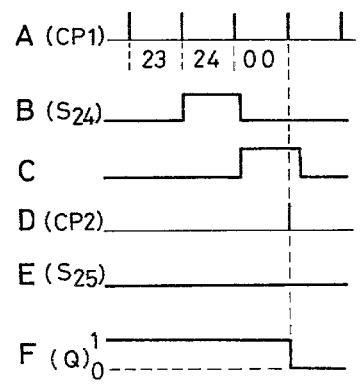
FIGS. 4A-4F are waveforms similar to those shown in FIGS. 3A-3F except are produced by reading a time code having a frame frequency of 25 frames per second.

The signals CP1, S24, S24 delayed one frame period and gated clock pulse signal CP2 (FIGS. 4A, 4B, 4C, and 4D) are similar to those described above with reference to FIGS. 3A to 3D. It will, however, be noticed that in this case the delayed pulse (FIG. 4C) coincides with the first frame period, that is the frame 00, in the next second. Moreover, since no frame numbered 25 exists in this code, no frame code for a frame 25 is supplied to frame code detector 7. Therefore, the output signal S25 of frame code detector 7 remains "0" (FIG. 4E). The short gated clock pulse signal CP2 is therefore supplied to the clock input CK of flip-flop 17 while a "0" is supplied to its J input. The output signal at the Q output of flip-flop 17 becomes "0" (FIG. 4F), or, alternatively, if the Q output of flip-flop 17 was already "0", it remains "0". This condition indicates 25 frames per second.

Figure 2:
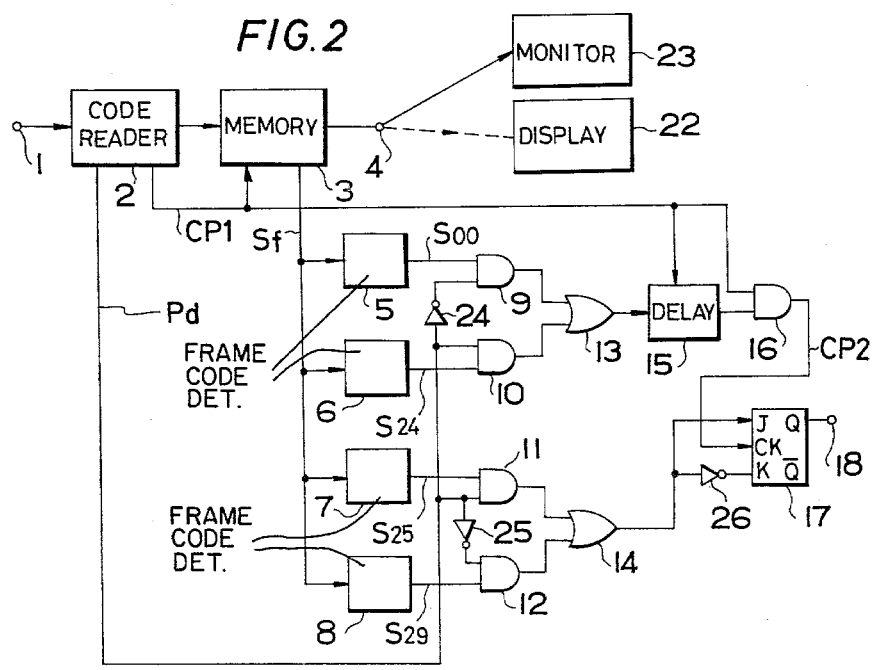
FIG. 2 is a block diagram of a video tape control time code reading apparatus according to an embodiment of the present invention.

Although is no reason to believe that the embodiment in FIG. 2 should fail to provide the correct output at output terminal 18 at the first transition from one second to the next, if such a failure should occur, as the operation described above is repeated every second. Thus, any failure to provide the correct output as the first transition is very quickly rectified. It will also be noticed that once flip-flop 17 is in the appropriate condition, no further switching of flip-flop 17 occurs. The output signal an output terminal 18 thus remains steady at "1" or "0" as appropriate.

The following paragraphs describe the operation when the video tape is transported in the reverse tape transport direction. FIGS. 5A to 5F show waveforms developed when the control time code supplied to the input terminal 1 is an SMPTE control time code associated with a video signal having a frame frequency at 30 frames per second, derived from a reverse direction of tape transport.

Figure 5:
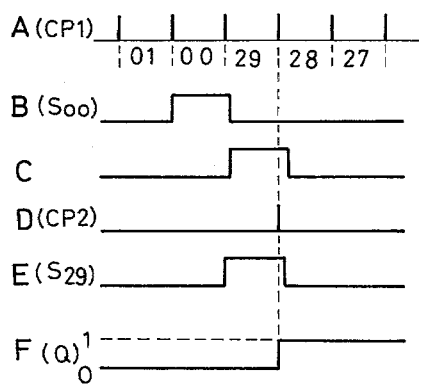
FIGS. 5A-5F correspond to FIGS. 3A-3F except the tape is run in the reverse direction.
Figure 6:
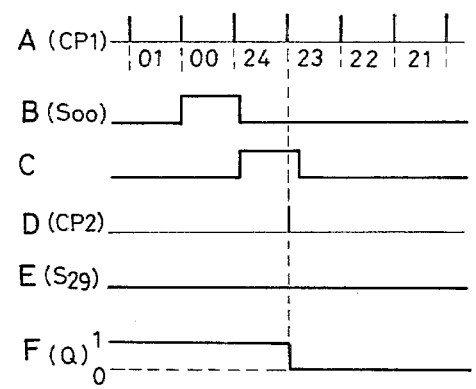
FIGS. 6A-6F correspond to FIGS. 4A-4F except being generated by a tape which is run in the reverse direction.

Since the tape transport direction is reversed signal Pd enables AND gates 9 and 12, but not AND gates 10 and 11. When the frame code for frame 00 is supplied to frame code detector 5, the output signal S00 thereof changes from "0" to "1" (FIG. 5B). The resulting pulse passes AND gate 9 and, after being delayed one frame period by delay 15, is supplied to AND gate 16. This delayed pulse (FIG. 5C) acts as a gating pulse for clock signal CP1 at AND gate 16 to allow one short gated clock pulse CP2 to pass AND gate 16 (FIG. 5D).

When the frame code for frame 29 is supplied to frame code detector 8, the output signal S29 thereof changes from "0" to "1" (FIG. 5E), and the resulting pulse passes AND gate 12 and OR gate 14, to be applied to the J and K inputs of flip-flop 18 directly and after inversion respectively. In coincidence with this, the short gated clock pulse CP2 is supplied to flip-flop 17. The output signal developed at the Q output of the flip-flop 17 becomes "1" (FIG. 4F), or alternatively, if it is already "1", it remains "1". This signal applied to output terminal 18 indicates 30 frames per second, just as in the case when the tape transport direction was forward.

FIGS. 6A to 6G show waveforms developed when the control time code supplied to the input terminal 1 is an EBU control time code associated with a video signal having a frame frequency of 25 frames per second, derived from tape transport in the reverse direction.

The signals CP1, S00, S00 delayed one frame period and CP2, the waveforms of which are shown in FIGS. 6A, 6B, 6C and 6D are generally similar to those described above with reference to FIGS. 5A to 5D. It will, however, be noticed that the delayed pulse shown in FIG. 6C which originated in the first frame period 00, is applied to AND gate 16 during frame 24 of the adjacent second because of the reverse direction of tape transport. Moreover, since there is no frame 29 in the EBU time code, no frame code for a frame 29 is supplied to frame code detector 8, and there is therefore no pulse produced in output signal S29 (FIG. 6E). The short gated clock pulse signal CP2 is therefore supplied to the clock input CK of JK flip-flop 17 while a "0" exists at its J input. The output at the Q output of flip-flop 17 therefore becomes "0" (FIG. 6F), or, alternatively, if already "0", it remains "0". This condition indicates 25 frames per second, just as in the case where the tape transport direction was forward.

Although the embodiment of FIG. 2 includes memory 3, this is merely a convenient means of storing the control time code and extracting the required parts from it. Such extraction can be carried out without a memory 3 to store the control time code. Also, delay 15 may provide a delay of more than one frame period, without departing from the scope of the invention. Conforming modifications of a type which would be clear to one skilled in the art must be made to the embodiment to accommodate these differences.

Figure 7:
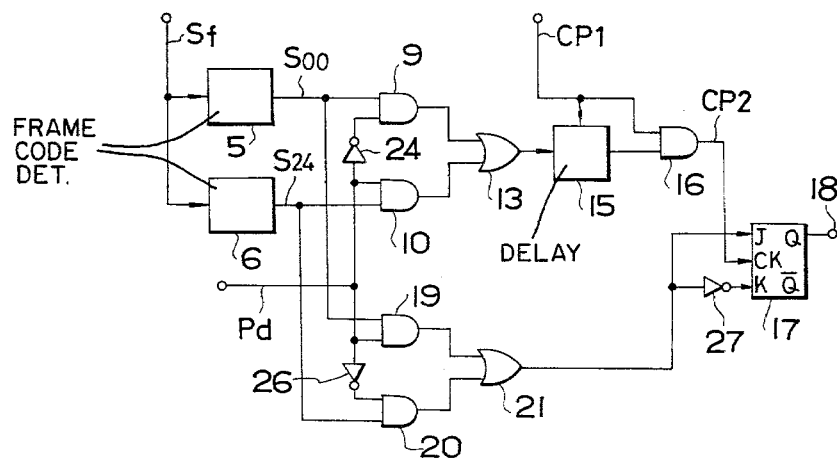
FIG. 7 is a block diagram of a video tape control time code reading apparatus according to a second embodiment of the invention.

A second embodiment of the invention is described with reference to FIG. 7, which illustrates only those parts of the embodiment necessary to describe how it differs from the first embodiment shown in FIG. 2.

The second embodiment omits frame code detectors 7 and 8 of the first embodiment for detecting frames 25 and 29. AND gates 19 and 20 are provided with input signals S00 and S24 from frame code detectors 5 and 6 respectively. Signal Pd is supplied directly to one input of AND gate 19, and by way of an inverter 26 to one input of AND gate 20. The outputs of AND gates 19 and 20 are respectively connected to two inputs of an OR gate 21, the output of which is connected to the J and K inputs of flip-flop 17 directly and by way of inverter 21, respectively.

The operation of the second embodiment is very similar to that of the first embodiment, and will therefore only be described briefly.

When the control time code supplied to input terminal 1 is an SMPTE control time code corresponding to a frame frequency of 30 frames per second, signals are developed as shown in FIGS. 3A to 3D. In particular the short gated clock pulse signal CP2 is supplied to flip-flop 17. However, following frame 24 there is no "1" in signal S24 from frame code detector 6 (FIG. 3B). There is thus no output from OR gate 21. The output signal developed at the Q output of flip-flop 17 becomes or remains "0" indicating 30 frames per second.

When the control time code supplied to input terminal 1 is an EBU control time code corresponding to a frame frequency of 24 frames per second, signals will be developed as shown in FIGS. 4A to 4D. The short gated clock signal CP2 is supplied to flip-flop 17 during frame 24. Signal singal S00 from the frame code detector 5 is "1" at this time, a "1" is applied from OR gate 21 to the J input of flip-flop 17. The output signal at the Q output of flip-flop 17 becomes or remains "1" indicating 25 frames per second.

Generally similar operations occur when the tape transport direction is reversed, waveforms corresponding to FIGS. 5A to 5D and 6A to 6D, respectively, being developed in response to SMPTE and EBU control time codes. Again the output signal developed at the Q output of the flip-flop 17 is, in this embodiment, "0" indicating 30 frames per second, or "1" indicating 25 frames per second.

Having described specific preferred embodiments of the invention with reference to the accompanying drawings, it is to be understood that the invention is not limited to these precise embodiments, and that various changes and modifications can be effected therein by one skilled in the art without departing from the scope and spirit of the invention as defined by the appended claims.

I claim:

1. A method for distinguishing between first and second control time codes recorded on a recording tape, said first and second control time codes including frame numbers sequentially repeating and having equal minimum values and said first control time code having a first maximum value which exceeds a second maximum value of said second control time code, said recording tape being transportable in a forward tape transport direction and in a reverse tape transport direction, said frame numbers sequentially increasing from said minimum to said maximum value during forward tape transport and sequentially decreasing from said maximum to said minimum value during reverse tape transport, comprising the steps of:

detecting whether tape transport is in said forward or reverse tape transport direction;
   comparing a first frame number in a first frame with a next-occurring frame number;

during forward tape transport, producing an output signal indicative of said first control time code in response to said first frame number being said second maximum value and said next-occurring frame number being other than said minimum values; and during reverse tape transport, producing an output signal indicative of said first control time code in response to said first frame number being said minimum values and said next-occurring frame number being other than said second maximum value.

2. A method for distinguishing between first and second different control time codes having at least frame codes which identify repeating sequences of contiguous frame numbers therein reproduced from a video magnetic tape containing video signals recorded thereon, comprising the steps of:

sensing the presence and absence of predetermined frame numbers in the reproduced control time code; and detecting in dependence on the presence and absence of said predetermined frame numbers, whether said reproduced control time code is said first or said second control time code.

3. A method according to claim 2 wherein said first control time code corresponds to a video signal having 30 frames per second, said second control time code corresponds to a video signal having 25 frames per second, and said sensing step comprises sensing the frame numbers corresponding respectively to highest and lowest frame numbers in said second control time code.

4. A method according to claim 3 wherein said sensing step further comprises sensing the frame codes identifying respectively a frame number one higher than said highest frame number in said second control time code and a frame number corresponding to the highest frame number in said first control time code.

5. A method for distinguishing between at least first and second control time codes reproduced from a video tape which contains frames of video recorded thereon, said first control time code including at least first repeating sequences of frame codes identifying individual frames of said video, said first repeating sequences repetitively beginning with a first number and ending with a second number, said second control time code including at least second repeating sequences of frame codes identifying individual frames of said video, said second repeating sequences repetitively beginning with said first number and ending with a third number which is greater than said second number, comprising the steps of:

sensing one of said first, second and third numbers; and sensing whether a next-occurring frame code after said sensing of said one of said first, second and third numbers includes a next frame number in one of said repeating sequences and producing in dependence thereon an output signal indicative of one of said first and second control time codes.

6. A method according to claim 5, further comprising:

selectively transporting said video tape in first and second directions;

sensing the direction of tape transport; and said step of sensing one of said first, second and third numbers includes selectively sensing one of said first, second and third numbers upon transport of said video tape in said first and second directions, respectively.

7. A method according to claim 6, further comprising:

selectively sensing said third number and a fourth number which is one greater than said second number; and sensing whether said next-occurring frame code after sensing said first number includes said third number or whether a next-occurring frame code after sensing said second number is said fourth number and producing, in dependence thereon, an output signal indicative of said second control time code.

8. A method according to claim 5, further comprising sensing whether said next-occurring frame code after sensing of said one of said first and second numbers includes either said third number or a fourth number which is one greater than said second number and producing in dependence thereon a second output signal indicative of said second control time code.

9. A video tape control time code reading apparatus for distinguishing one of at least first and second different control time codes having frame numbers corresponding respectively to frames of video signals having first and second different frame frequencies recorded on said video tape, the apparatus comprising:

means for receiving said control time code;

means for sensing the presence and absence of predetermined frame numbers within said control time code; and means operative in dependence on the presence and absence of said predetermined frame numbers, for distinguishing between said control time code being said first and said second time code.

10. A video tape control time code reading apparatus according to claim 9 wherein said first frame frequency is 30 frames per second, said second frame frequency is 25 frames per second, and said means for sensing includes means for sensing said frame numbers corresponding respectively to a highest and a lowest frame number in said second control time code.

11. A video tape control time code reading apparatus according to claim 10, wherein said means for sensing further includes means for sensing a frame number one higher than said highest frame number in said second control time code and a frame number corresponding to the highest frame number in said first control time code.

12. A video tape control time code reading apparatus according to claim 9, wherein said first frame frequency is 30 frames per second and said second frame frequency is 25 frames per second, said video tape having at least a forward direction of tape transport, and said apparatus comprises means for generating a first signal indicating at least said forward direction of tape transport, means for generating a first pulse in response to the highest frame number in said second control time code, means for delaying said first pulse for one frame period, means for generating a second pulse in response to a frame number one higher than said highest frame number in said second control time code, and means for detecting simultaneous existence of said delayed first pulse and said second pulse while said first signal indicates said forward direction of tape transport and thereupon supplying an output signal indicating that said frame frequency is 30 frames per second, and for detecting simultaneous existence of said delayed first pulse and absence of said second pulse while said first signal indicates said forward direction of tape transport and for thereupon supplying an output signal indicating that said frame frequency is 25 frames per second.

13. A video control time code reading apparatus according to claim 12 wherein said video tape also has a reverse direction of tape transport, further comprising said means for generating a first signal being further operative to indicate said reverse direction of tape transport, means for generating a third pulse in response to a lowest frame number in said first and second control time codes, means for delaying said third pulse for one frame period, means for generating a fourth pulse in response to the highest frame number in said first control time code, and means for detecting simultaneous existence of said delayed third pulse and said forth pulse while said first signal indicates said reverse direction of tape transport and for thereupon supplying an output signal indicating a frame frequency of 30 frames per second, and for detecting existence of said delayed third pulse and absence of said fourth pulse while said first signal indicates said reverse direction of tape transport and for thereupon supplying an output signal indicating a frame frequency of 25 frames per second.

14. A video tape control time code reading apparatus according to claim 9 wherein said means for receiving includes means for storing a portion of said one control time code corresponding to one frame of said video signal, and means for extracting from said portion at least said frame number.

15. A video tape control time code reading apparatus according to claim 14 wherein said video tape has first and second tape transport directions and said means for receiving includes means for determining said transport direction in dependence on said one control time code and for supplying a direction signal indicating one of said first and second tape transport directions.

* * * * *